(12) United States Patent
Mittal

(10) Patent No.: US 7,921,088 B1
(45) Date of Patent: *Apr. 5, 2011

(54) LOGICAL OPERATIONS ENCODED BY A FUNCTION TABLE FOR COMPRESSING INDEX BITS IN MULTI-LEVEL COMPRESSED LOOK-UP TABLES

(75) Inventor: Millind Mittal, Palo Alto, CA (US)

(73) Assignee: X-Engines, Inc., Palo Alto, CA (US)

( * ) Notice: Subject to any disclaimer, the term of this patent is extended or adjusted under 35 U.S.C. 154(b) by 552 days.

This patent is subject to a terminal disclaimer.

(21) Appl. No.: 11/683,157

(22) Filed: Mar. 7, 2007

Related U.S. Application Data

(63) Continuation-in-part of application No. 11/309,160, filed on Jul. 3, 2006, now Pat. No. 7,430,560.

(60) Provisional application No. 60/860,112, filed on Nov. 18, 2006, provisional application No. 60/818,832, filed on Jul. 6, 2006, provisional application No. 60/720,712, filed on Sep. 27, 2005, provisional application No. 60/701,442, filed on Jul. 22, 2005.

(51) Int. Cl.
*G06F 7/00* (2006.01)

(52) U.S. Cl. ...................................... 707/693

(58) Field of Classification Search .................... 707/693
See application file for complete search history.

(56) References Cited

U.S. PATENT DOCUMENTS

| | | | |
|---|---|---|---|
| 5,105,353 A | | 4/1992 | Charles et al. |
| 5,276,868 A | * | 1/1994 | Poole ................................ 707/3 |
| 5,640,551 A | | 6/1997 | Chu et al. |
| 5,651,099 A | | 7/1997 | Konsella |
| 5,781,772 A | | 7/1998 | Wilkinson, III et al. |
| 5,813,001 A | | 9/1998 | Bennett |
| 6,067,574 A | | 5/2000 | Tzeng |
| 6,247,014 B1 | * | 6/2001 | Ladwig et al. ................ 707/100 |
| 6,279,097 B1 | * | 8/2001 | Kaku ............................ 711/216 |
| 6,691,131 B2 | | 2/2004 | Tikkanen et al. |
| 6,697,363 B1 | | 2/2004 | Carr |
| 6,779,101 B1 | * | 8/2004 | Berg et al. ........................ 712/24 |
| 6,782,382 B2 | * | 8/2004 | Lunteren ........................... 707/3 |
| 6,910,043 B2 | * | 6/2005 | Iivonen et al. ................ 707/101 |
| 7,007,101 B1 | | 2/2006 | Schwaderer |
| 7,019,674 B2 | | 3/2006 | Cadambi et al. |
| 7,046,175 B1 | * | 5/2006 | Subramaniam ............... 341/106 |
| 7,376,814 B1 | * | 5/2008 | Saville et al. ................. 712/210 |
| 2004/0111440 A1 | | 6/2004 | Richardson et al. |

(Continued)

*Primary Examiner* — Etienne P LeRoux
*Assistant Examiner* — Thu Nga Nguyen
(74) *Attorney, Agent, or Firm* — Stuart T. Auvinen; gPatent LLC

(57) ABSTRACT

Compressed stride tables in a multi-bit Trie structure perform lookups. An input lookup key is divided into strides including a current stride of S bits. A valid entry in a current stride table is located by compressing the S bits, forming a compressed index of D bits into the current stride table. A compression function logically combines the S bits to generate the D compressed index bits. An entry in a prior-level table points to the current stride table and has an opcode field indicating which compression function and mask to use. Compression functions can include counts of leading-repeated bits, and very complex functions such as hashes, CRC, encryption. A function table stores results of the complex functions that are addressed by the S bits of the current stride. The opcode field in the stride entry selects from among several tables, each storing results for a different function.

18 Claims, 15 Drawing Sheets

U.S. PATENT DOCUMENTS

2004/0117600 A1    6/2004  Bodas et al.
2004/0167923 A1*   8/2004  Carr ............................. 707/102
2005/0187898 A1    8/2005  Chazelle et al.
2006/0288024 A1*  12/2006  Braica .......................... 707/101

* cited by examiner

75% SIZE REDUCTION

| UNCOMPRESSED INDEX BITS | RC | |
|---|---|---|
| 00001101 | RC=3 | 011 |
| 00000001 | RC=6 | 110 |
| 00101101 | RC=1 | 001 |
| 01101111 | RC=0 | 000 |
| 11101101 | RC=2 | 010 |
| 11111111 | RC=7 | 111 |

REPEAT CNT:
  RC = # TIMES MSB IS REPEATED -1

FIG. 7

→ USE FOR NEW COMPRESSED INDEX BITS

| UNCOMPRESSED INDEX BITS | | RESULT |
|---|---|---|
| 00001101 | OR=0 | R0 |
| 00000001 | OR=0 | R0 |
| 00011101 | OR=1 | R1 |
| 00101101 | OR=1 | R1 |
| 01101101 | OR=1 | R1 |
| 10001111 | OR=1 | R1 |

OR FCN:
  OR_CNT=4
  OR 4 MSB'S

FIG. 8A

→ USE FOR NEW COMPRESSED INDEX BITS

| UNCOMPRESSED INDEX BITS | | RESULT | |
|---|---|---|---|
| 0000XXXX | OR=0 | R0 | <16 |
| 0001XXXX | OR=1 | R1 | |
| 001XXXXX | OR=1 | R1 | >=16 |
| 01XXXXXX | OR=1 | R1 | |
| 1XXXXXXX | OR=1 | R1 | |

FIG. 8B

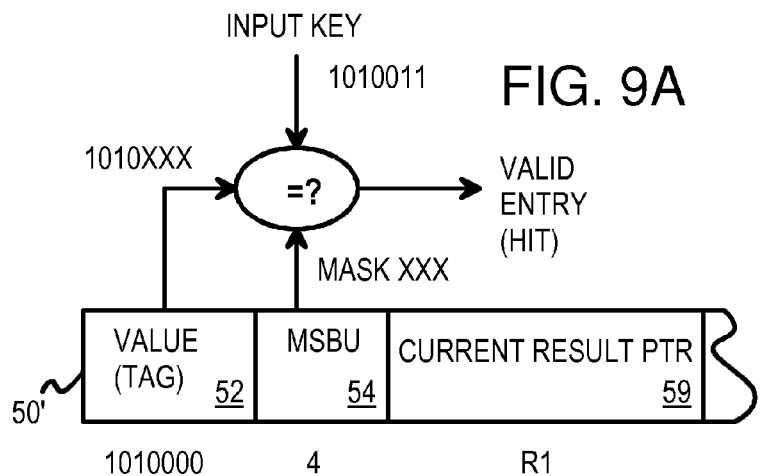
FIG. 9A
REGIONAL ENTRY
1010 XXX  =  1010 000
              1010 001
              1010 010
1 REGIONAL ENTRY   1010 011
REPLACES           1010 100    CURRENT
8 ENTRIES          1010 101    RESULT
                   1010 110    = R1
                   1010 111
FIG. 9B
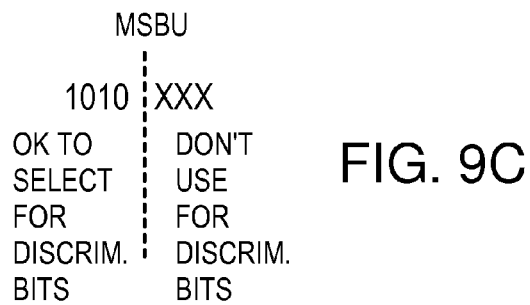
FIG. 9C

RANGE ENCODING:

XXXX ==> 0111

XX   ==>   01

XXXXXX ==> 011111

| UNCOMPRESSED INDEX BITS | | RC | RANGE FLAG | RANGE ENCODING |
|---|---|---|---|---|
| 0000XXXX | RC=3 | 011 | 1 | 00000111 1 |
| 00000001 | RC=6 | 110 | 0 | 00000001 0 |
| 001XXXXX | RC=1 | 001 | 1 | 00101111 1 |
| 0XXXXXXX | RC=0 | 000 | 1 | 00111111 1 |
| 111XXXXX | RC=2 | 010 | 1 | 11101111 1 |
| 11111111 | RC=7 | 111 | 0 | 11111111 0 |

USE FOR NEW COMPRESSED INDEX BITS

| UNCOMPRESSED INDEX BITS | | RC | RANGE FLAG | ENCODED INDEX BITS |
|---|---|---|---|---|
| 0000XXXX | RC=3 | 011 | 1 | 00000111 |
| 00000001 | RC=6 | 110 | 0 | 00000001 |
| 001XXXXX | RC=1 | 001 | 1 | 00101111 |
| 0XXXXXXX | RC=0 | 000 | 1 | 00111111 |
| 111XXXXX | RC=2 | 010 | 1 | 11101111 |
| 11111111 | RC=7 | 111 | 0 | 11111111 |

↑ MSBU(MAX)=B7

B6,5,4,2 DISTINGUISH

→ USE FOR NEW COMPRESSED INDEX BITS

FIG. 11A

| UNCOMPRESSED INDEX BITS | | RESULT | ENCODED INDEX BITS |
|---|---|---|---|
| 0000 XXXX | RC=3 | R1 | 00000111 |
| 0001 0001 | RC=2 | R2 | 00010001 |
| 0010 1XXX | RC=1 | R3 | 00101011 |
| 0110 1XXX | RC=0 | R4 | 01101011 |
| 1110 10XX | RC=2 | R5 | 11101001 |
| 1111 1111 | RC=7 | R6 | 11111111 |

↑ MSBU(MAX)=B4

MASKED LSB'S

FIG. 11B

UNMASKED MSB'S

USE FOR NEW COMPRESSED INDEX BITS

AMBIGUOUS IF USED FOR INDEX BITS -

(USE AS SECONDARY BITS IF NEEDED)

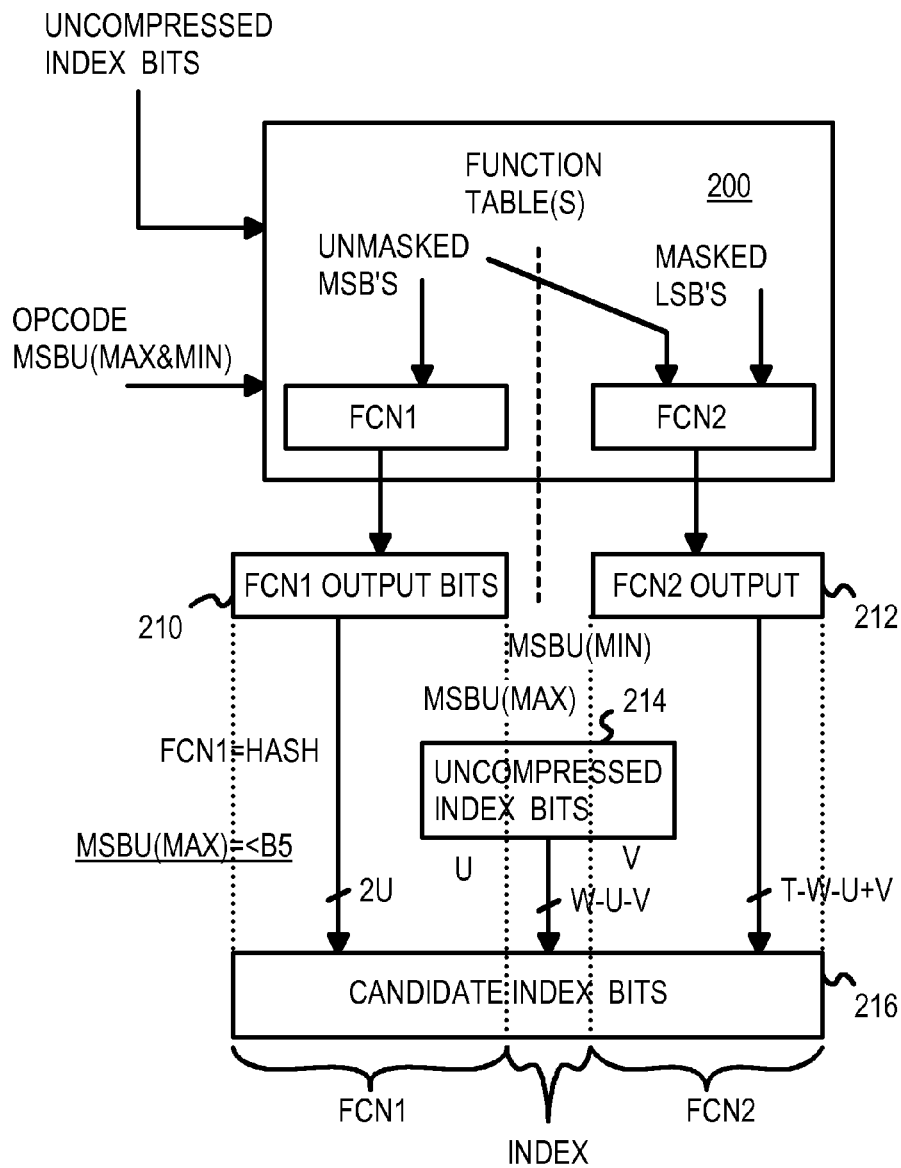

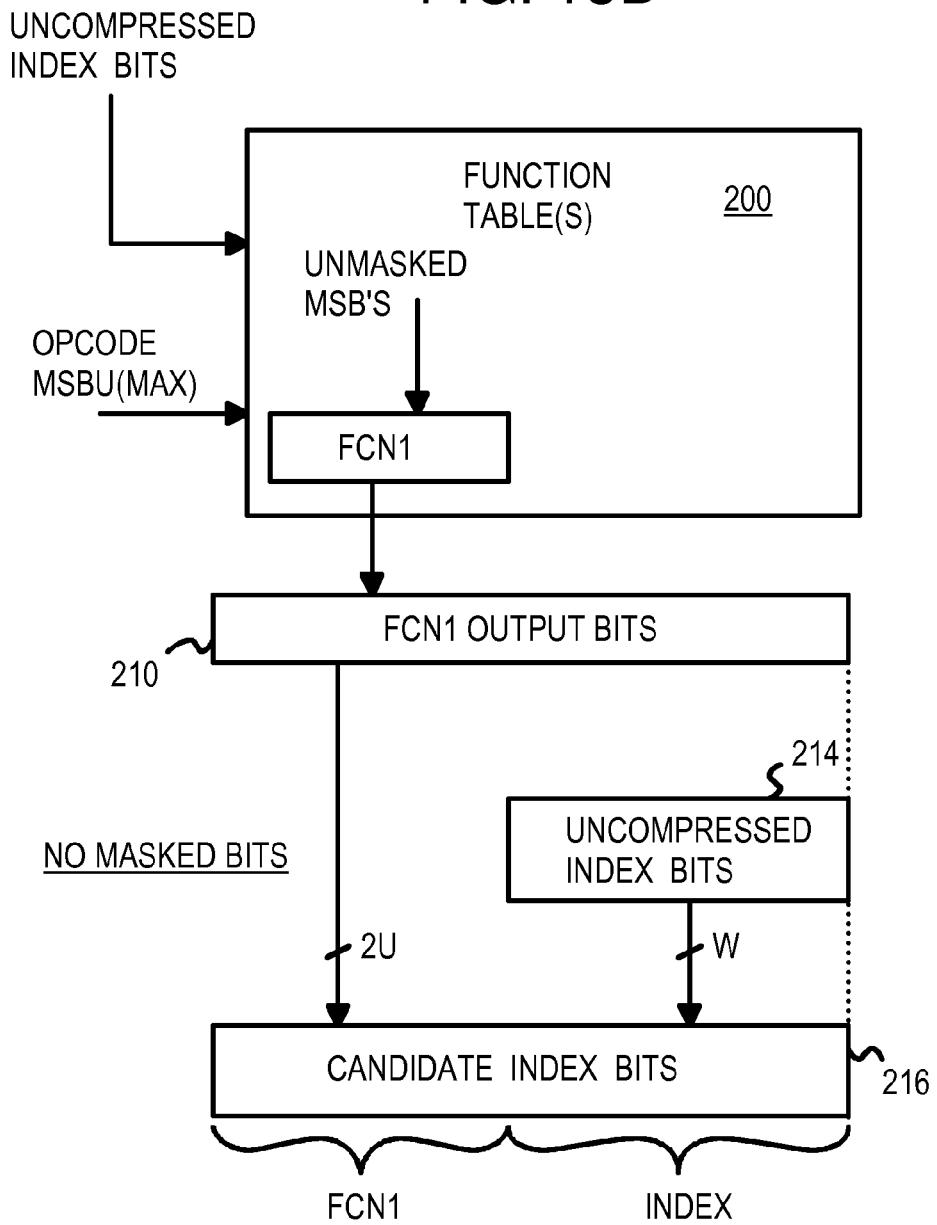

LOGICAL OPERATIONS ENCODED BY A FUNCTION TABLE FOR COMPRESSING INDEX BITS IN MULTI-LEVEL COMPRESSED LOOK-UP TABLES

RELATED APPLICATION

This application is a continuation-in-part of the co-pending application for "Multi-Level Compressed Look-up Tables Formed by Logical Operations to Compress Selected Index Bits", U.S. Ser. No. 11/309,160, filed Jul. 2, 2006, which claims the benefit of U.S. Provisional Applications 60/701,442 filed Jul. 22, 2005, and 60/720,712 filed Sep. 27, 2005, and 60/818,832 filed Jul. 26, 2006 and 60/860,112 filed Nov. 30, 2006.

FIELD OF THE INVENTION

This invention relates to table lookups, and more particularly to look-up engines for large table structures divided into strides.

BACKGROUND OF THE INVENTION

Some data structures contain huge amounts of data. For example, large networks can have millions or billions of destinations and millions of intermediate nodes, and each node may be identified by its own network address.

Traffic in a network may be routed by looking up records in a routing table or structure. The widely-used Internet Protocol, version 4 (IPv4) uses 32-bit IP addresses and can support up to $2^{32}$ IP nodes, or about 4 billion addresses. A newer version, IPv6, uses 128-bit IP addresses and can have $2^{128}$ IP-addressable nodes. Each record in a data structure might contain one IP address or a range of IP addresses. Routers, switches, and other network nodes may contain a subset of the available IP addresses.

A linear binary search may be used on multiple levels of lookup. Each bit of an input lookup key is used to decide between forks in paths through a tree-like table structure. Since multiple levels of search are required, search time is slow, although the storage space needed for the table is more efficient. A traditional Trie structure has a number of access levels equal to a number of bits in the input key. Each stride, or jump to the next level, consumes one bit of the input key.

A compromise data structure modifies the Trie structure to use strides of more than one bit. This structure can provide a good trade-off between access speed and storage requirements.

FIG. 1 shows prior-art stride tables in a multi-bit Trie structure. Key 18 is the lookup key that is input to the table structure. A lookup is an operation to find an entry in the table structure that matches key 18. Key 18 is divided into four strides S1, S2, S3, S3. In this simplified example, key 18 is only 8 bits wide, and each stride is 2 bits wide.

First stride S1 selects one of four entries in first-level stride table 10. Entries in table 10 contain pointers to tables 12 in the second level. For example, the top second-level table 12 is pointed to by the top entry in table 10, which is selected when S1 is 11. Another second-level table 12' is pointed to by the third entry in table 10, which is selected when S1 is 01.

Since each stride is 2 bits, each entry in one level points to a table of 4 entries in the next level. Thus a single table 10 in level 1 expands to four tables 12 in the second level, sixteen tables 14 in the third level, and sixty-four tables 16 in the fourth level. A lookup is performed by traversing the four levels of the tables in the table structure. For the example of key 18 having a value of 01110011, the first stride S1 is 01 and selects the third entry in table 10, which points to table 12' in level 2.

The two stride bits 11 for S2 select from among the four entries in each of tables 12. Since first-level stride table 10 pointed to table 12', an entry from selected table 12' is used and other tables 12 are ignored. The top entry in table 12' is selected by the value (11) of S2. This top entry contains a pointer to selected table 14' in level 3.

The two stride bits S3 of level three select from among the four entries in selected table 14' in the third level. The value of S3 is 00, which selects the lowest entry in selected table 14'. This entry has a pointer to one of the 64 tables in level four, selected table 16'.

The value of the fourth stride S4, 11, selects the upper of four entries in selected stride table 16'. This entry contains the result of the lookup, or a pointer to the result. The value 01110011 of key 18 returns this result. Both the key and the result may be composed of several fields that are combined together.

When longest-prefix matches (LPM) are supported, intermediate results may be stored in entries in tables 10, 12, 14 of the intermediate levels, rather than only at the end (leaf) levels.

While such Trie structures modified for multi-bit strides are useful compromises between a fast but large single-level table, and a slow but storage-efficient Trie structure, the storage requirements may still be large using stride tables.

The parent application disclosed using compression functions to compress stride tables. Network tables tend to be sparse tables since the address locations are sparsely populated with valid entries. Most memory locations tend to be empty, or have invalid entries.

Since network tables are sparse, the valid entries in a stride table may be compressed to squeeze out invalid entries and reduce the storage requirements. Ideally, only the valid entries would be stored, but in practice some invalid entries are also stored in the compressed tables. Thus the degree of compression may be less than ideal.

Rather than simply masking or deleting index bits to compress a table, index bits may be compressed using various functions. For example, two or more index bits may be combined together into a single index bit using a logical function such as a logical XOR. A variety of compression functions may be used such as XOR, AND, OR, rotate, shifts, and conditional operations. A field in the table entry can indicate which logical functions to perform for the next level of stride tables. Thus the different logical functions may be mixed together within a table structure to optimize compression.

FIG. 2 shows a logically-compressed stride table as described in more detail in the parent application. Table 20 is a stride table such as one of tables 10, 12, 14, 16 of FIG. 1. In FIG. 2, the current stride size is 4 bits. The current stride of the input key is used as a 4-bit index address that selects one of the 16 entries in stride table 20. Each entry in stride table 20 is in a location identified by a 4-bit index of bits A3, A2, A1, A0. Stride table 20 contains only 4 valid entries, at index locations 1100, 1011, 1001, and 1000. The other 12 indexes contain invalid or empty entries.

Since all four valid entries have a 1 in the most-significant-bit (MSB) of the index, or A3=1, index bit A3 is not needed to select among the four valid entries. Index bit A3 could be removed or masked from stride table 20, as was shown in prior-art FIG. 2. The entries with A3=0 are deleted, since they are all empty entries. Only the entries with A3=1 are retained in compressed stride table 20'.

Further compression can be achieved by combining two of the remaining three index bits to create a new index bit. In this example, index bits A2 and A1 are combined by an XOR function to generate a new A1 index bit. The old A2 and A1 index bits are replaced by this new A1 index bit. The result is that a 2-bit index is used in compressed stride table 22 to select among the 4 entries in table 22.

The size of stride table 22 has been reduced by 75% by masking one index bit (A3) and logically combining two other index bits (A2, A1). Empty entries are removed from compressed stride table 22. Other stride tables could also be compressed, reducing the overall storage requirements.

Two steps were performed to compress the 4 index bits down to 2 index bits. First, one of the index bits (A3) was masked out. Second, two index bits (A2, A1) were logically combined into one index bit (the new A1). The XOR function used for this logical combining is a compression function (CF). Other compression functions may be used for other tables, such as AND, OR, rotate, shift, or more complex functions such as AND-OR, etc.

FIG. 3 shows a generalized logical compressor with initial and final masking as described in the parent application. In this generalization of the compression function, two or more of the input bits selected by the initial mask are logically combined to create new candidate bits. A final selection is made from the full set of bits from the initial selection and from the newly created candidate bits.

The XOR of FIG. 2 created a new index bit (new A1) from two of the uncompressed index bits (A2, A1). This new index bit, the output of the XOR, was selected while the two original index bits were dropped. The operation of logical compressor 26 can be thought of as initially creating new candidate index bits (merged bits) by performing logical operations such as XOR, and then selecting from among the merged and original index bits to create the final compressed index.

It is expected that the combination of initial bit selection and final bit selection may lead to better candidates for index bits. Overall, fewer of the newly created index bits may need to be selected than if only the initial bits were available.

Uncompressed index bits are masked by an initial mask applied to initial masker 24. Some of the remaining bits from initial masker 24 bypass logical merger 28 and are input directly to final masker 30, while other bits from initial masker 24 are input to logical merger 28.

Logical merger 28 combines selected index bits from initial masker 24 using logical functions to produce merged bits E. For example, adjacent index bits may be combined by an XOR function, and the XOR results are the merged bits. The XOR results may be more efficient at encoding the valid entries than the original index bits, as was true of the XOR of A2, A1 in FIG. 2.

Final masker 30 receives both the original index bits selected by initial masker 24, and the merged bits created by logical merger 28. Final masker 30 selects from among the original and merged bits to output the final compressed index bits.

The compression function CF, or another control field, can indicate that merged bits are to be created, and which of the S-M unmasked index bits are combined together by logical merger 28. The final mask field can indicate which of the S-M index bits and E merged bits are output as the final compressed index.

When E merged bits are created by logical merger 28, and initial masker 24 removes M index bits from an original S index bits, and final masker 30 removes another F index bits, the number of final compressed index bits is S−M+E−F. These S−M+E−F bits select one entry in compressed stride table 22. The number of entries in compressed stride table 22 is $2^{S-M+E-F}$, which has $2^{M+F-E}$ entries fewer than uncompressed stride table 20.

Some of the entries in compressed stride table 22 may be invalid entries, since the number of valid entries may not be a power of 2. Compression may be less than ideal, even when a variety of compression functions are available. However, significantly better compression can be achieved than with the simple bit masking of FIG. 2.

FIG. 4 shows details of a logical merger that creates merged index bits. Uncompressed index bits are optionally masked by an initial mask (not shown in this embodiment). Some of the uncompressed index bits may bypass logical merger 28 and become bits in the compressed index, while other uncompressed index bits are input to logical merger 28 for further compression.

The uncompressed index bits are applied as inputs to logical gates 48, 48'. These may be discrete XOR logical gates, or they may be implemented in firmware or software or in an arithmetic-logic-unit (ALU) or similar programmable device. The compression function CF applied to logical compressor 26 determines which of logical gates 48, 48', 49 are selected, while the others are disabled.

Some stride tables may compress better with two-level XOR'ing, while other stride tables compress well using 2-input or 4-input XOR'ing. When the stride tables are being constructed or new entries are being added that cause a stride table to be expanded, software can test the various CF functions and choose an optimal function from the many available functions. Routines that find the best CF functions and which index bits to compress can be written that either intelligently find the optimal or near-optimal choices, or that try all combinations and then select the one with the best results.

More examples of compression functions that can be used with the invention of the parent application are desired. Compression functions that are optimized for a variety of data sets and types are desirable.

BRIEF DESCRIPTION OF THE DRAWINGS

FIG. 7 highlights a repeat-count compression function.

FIGS. 8A-B show an OR compression function.

FIGS. 9A-C show a regional entry that covers a range of input key values as disclosed in the parent application.

FIGS. 11A-B shows using unmasked bit positions of range-encoded index bits for compression.

FIGS. 13A-D diagram upper unmasked and lower masked bits generated by a function table and incorporated into candidate index bits.

DETAILED DESCRIPTION

The present invention relates to an improvement in lookup table structures. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
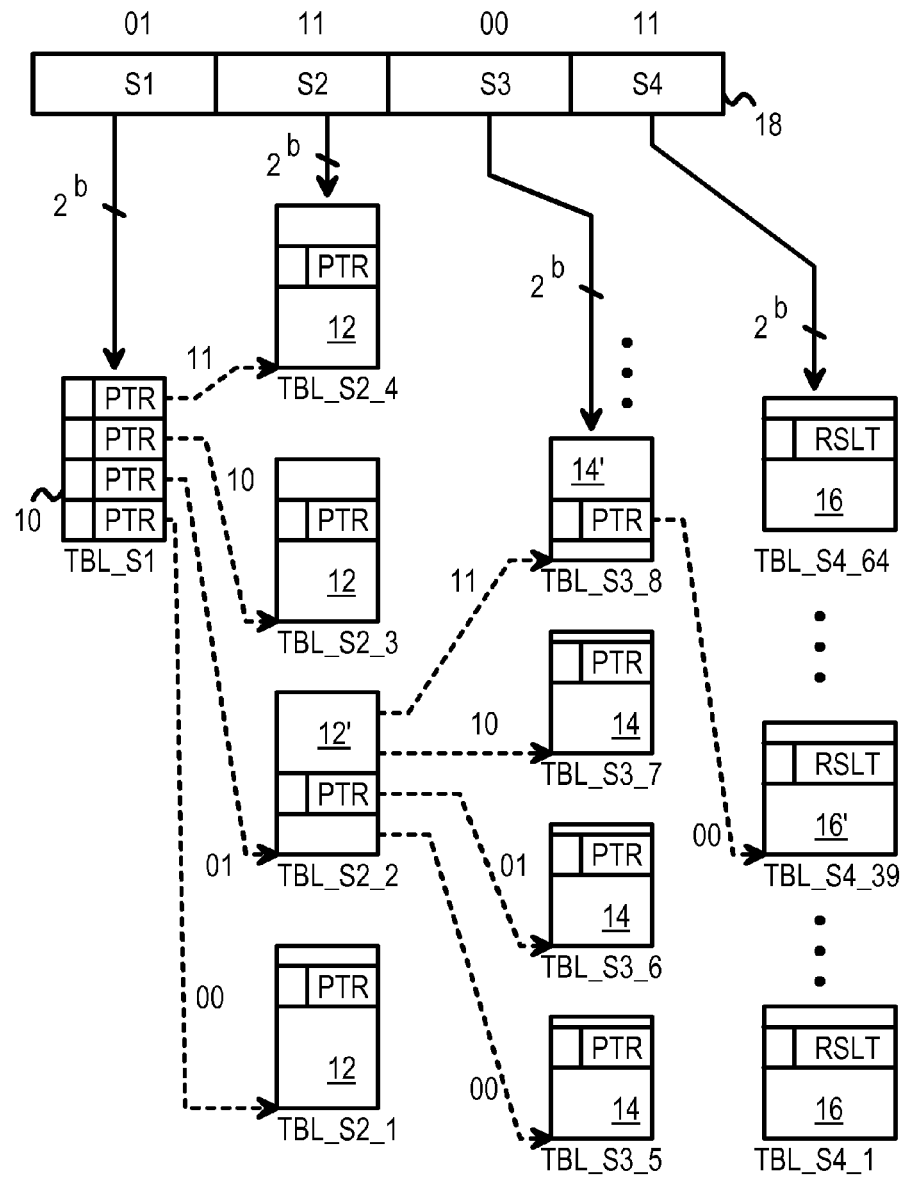
FIG. 1 shows prior-art stride tables in a multi-bit Trie structure.
Figure 2:
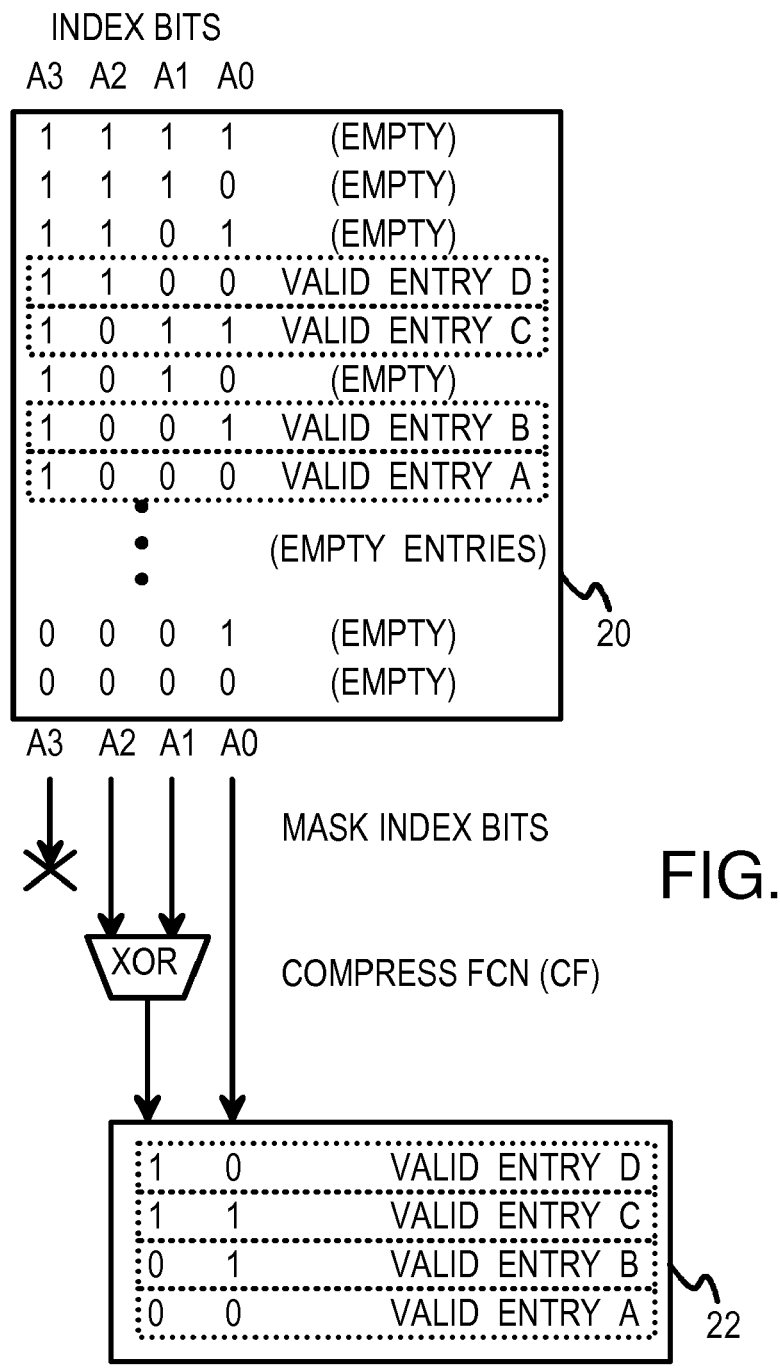
FIG. 2 shows a logically-compressed stride table as described in more detail in the parent application.
Figure 3:
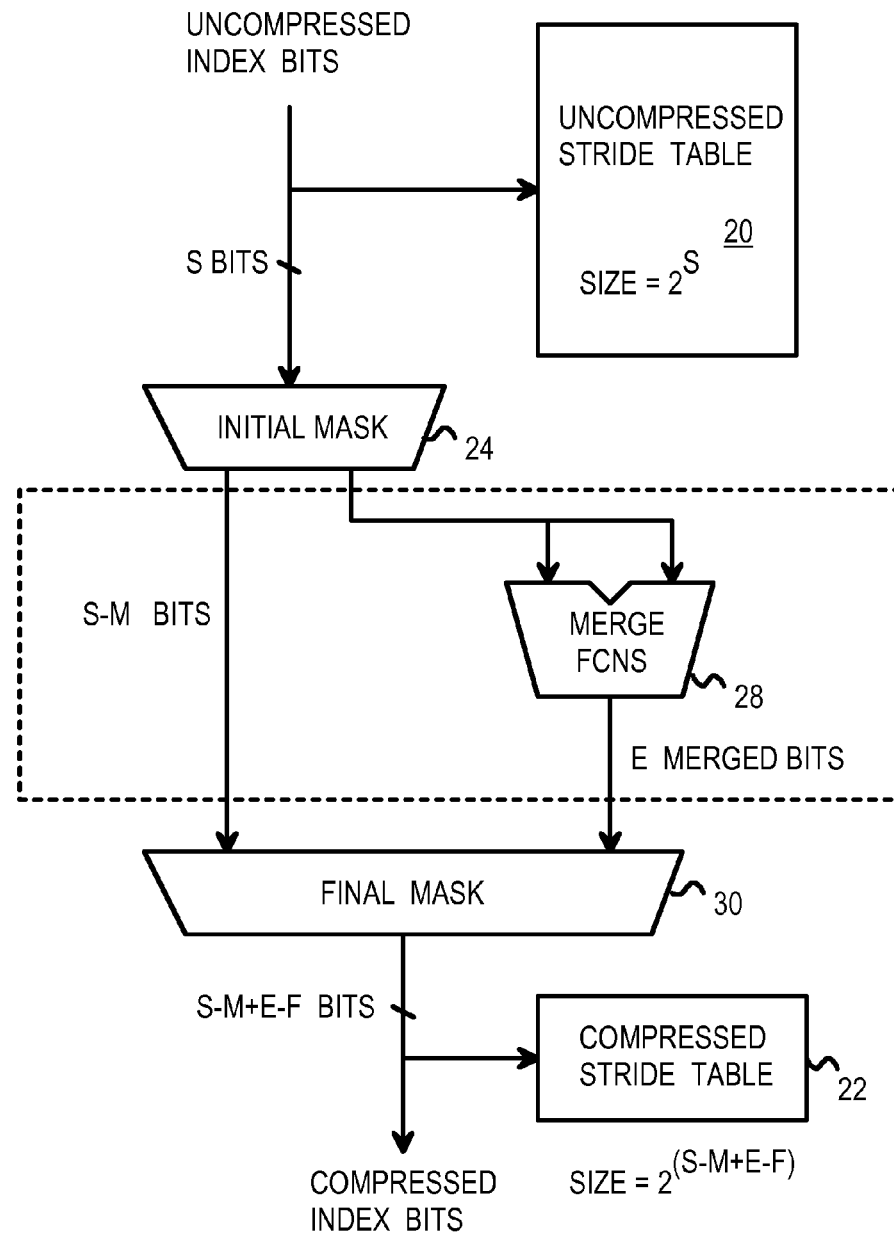
FIG. 3 shows a generalized logical compressor with initial and final masking as described in the parent application.
Figure 4:
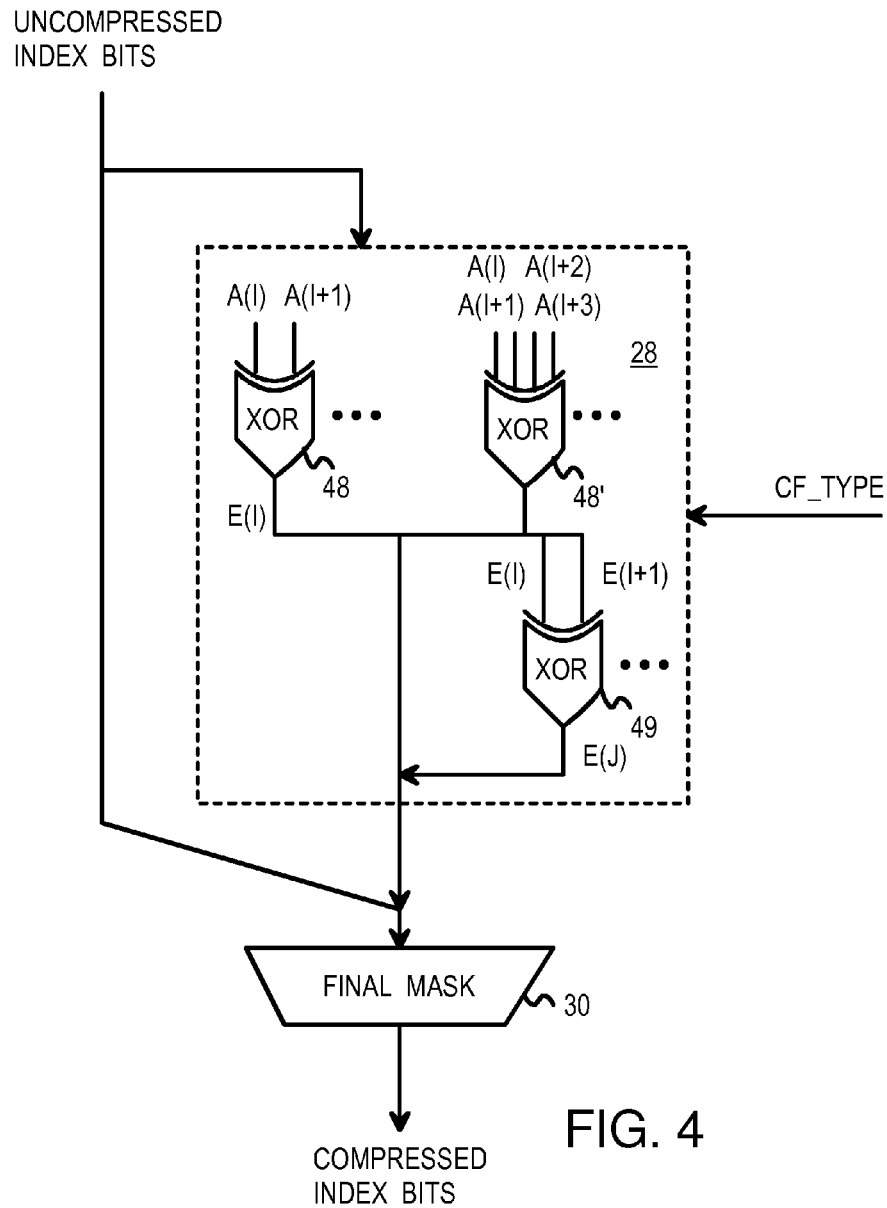
FIG. 4 shows details of a logical merger that creates merged index bits.
Figure 5:
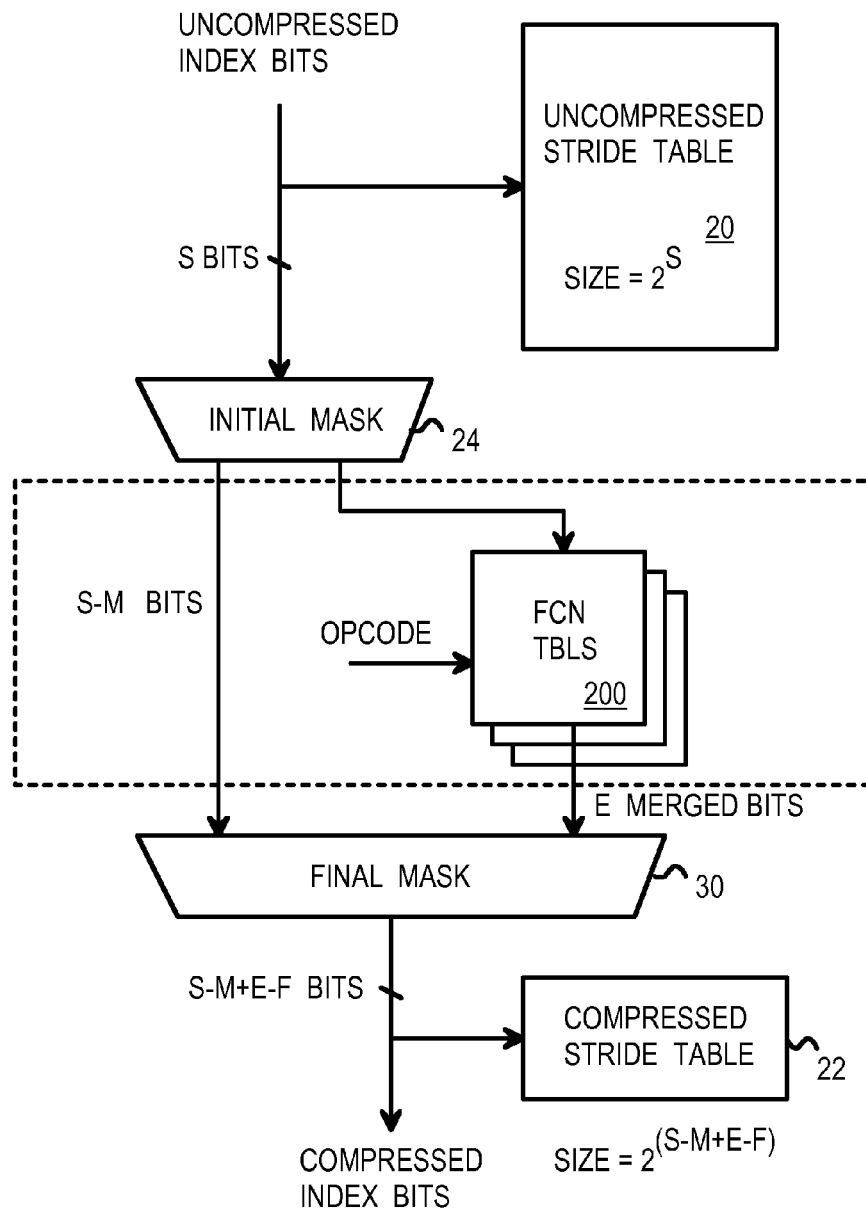
FIG. 5 shows a logical compressor that uses predefined function tables.

FIG. 5 shows a logical compressor that uses predefined function tables. Function table 200 can be a small RAM or ROM or other lookup table, or logic that implements such a table. Index bits from initial masker 24 form an address into function table 200 that addresses or selects one entry in the table, while the selected entry is output from the RAM table as the result of the function. Thus the values of the entries inside function table 200 define the function.

For example, a simple 2-bit XOR compression function could have four entries in function table 200:

| Input Index Bits (Address) | Entry Value (Function Result) |
|---|---|
| 11 | 0 |
| 10 | 1 |
| 01 | 1 |
| 00 | 0 |

The 2 input index bits are compressed to one bit, the function result, in this simple example. More complex functions with 8 input bits and multiple output bits could be implemented by function table 200. For example, highly complex functions such as MD5 hash, DES encryption, cyclical-redundancy-check (CRC), error-correction code (ECC), and Secure Hash Algorithm (SHA) could be implemented merely by filling in the proper output value for each input address. The function does not have to be known mathematically, only the outputs that correspond to each input value are needed. For example, secret formulas of encryption algorithms are not needed, only the encryption output values for each input value in the table.

Functions could even be combined in function table 200. Upper bits could be generated by one function, such as a hash function, while lower bits are generated by a second function, such as an XOR function. Each result value outputs could contain upper bits that are the result of the hash function, and lower bits that are the result of the XOR function. Thus using function table 200 to define the compression function is powerful and flexible while being easy to implement. The function can be updated or changed by changing the entry values stored in function table 200.

Rather than have a single function table 200, multiple function tables may be available. The compression opcode or an operand selects which of the tables to use as function table 200 for this particular stride. Each of the multiple tables can be pre-populated with entries for the result of that function, and the opcode then selects one of the tables that is populated with results for the desired function.

Input bits selected by the initial mask are input to function table 200 as the table's index to create new candidate bits. A final selection is made from the full set of bits from the initial selection and from the newly created candidate bits that are read from function table 200. The compression opcode that selects from among multiple tables can also be used to reduce the number of S bits to reduces the size of the final mask.

Combination of initial bit selection and final bit selection may lead to better candidates for index bits. Overall, fewer of the newly created index bits may need to be selected than if only the initial bits were available. Only a few of the E merged bits that are output from function table 200 may be selected to be part of the final compressed index bits. The initial mask is optional and can be deleted in some embodiments. All uncompressed index bits could be used as the index into function table 200.

Uncompressed index bits are optionally masked by an initial mask applied to initial masker 24. Some of the remaining bits from initial masker 24 bypass function table 200 and are input directly to final masker 30, while other bits from initial masker 24 are input to function table 200.

Final masker 30 receives both the S-M original index bits selected by initial masker 24, and the E merged bits created by function table 200. Final masker 30 selects from among the original and merged bits to output the S−M+E−F final compressed index bits.

The compression function CF, or another control field, can indicate which of the S-M unmasked index bits are input to function table 200. The final mask field can indicate which of the S-M index bits and E merged bits are output as the final compressed index.

Some of the entries in compressed stride table 22 may be invalid entries, since the number of valid entries may not be a power of 2. Compression may be less than ideal, even when a variety of compression functions are available using function table 200. However, the versatility of function table 200 can allow for compressions that are close to ideal.

Figure 6:
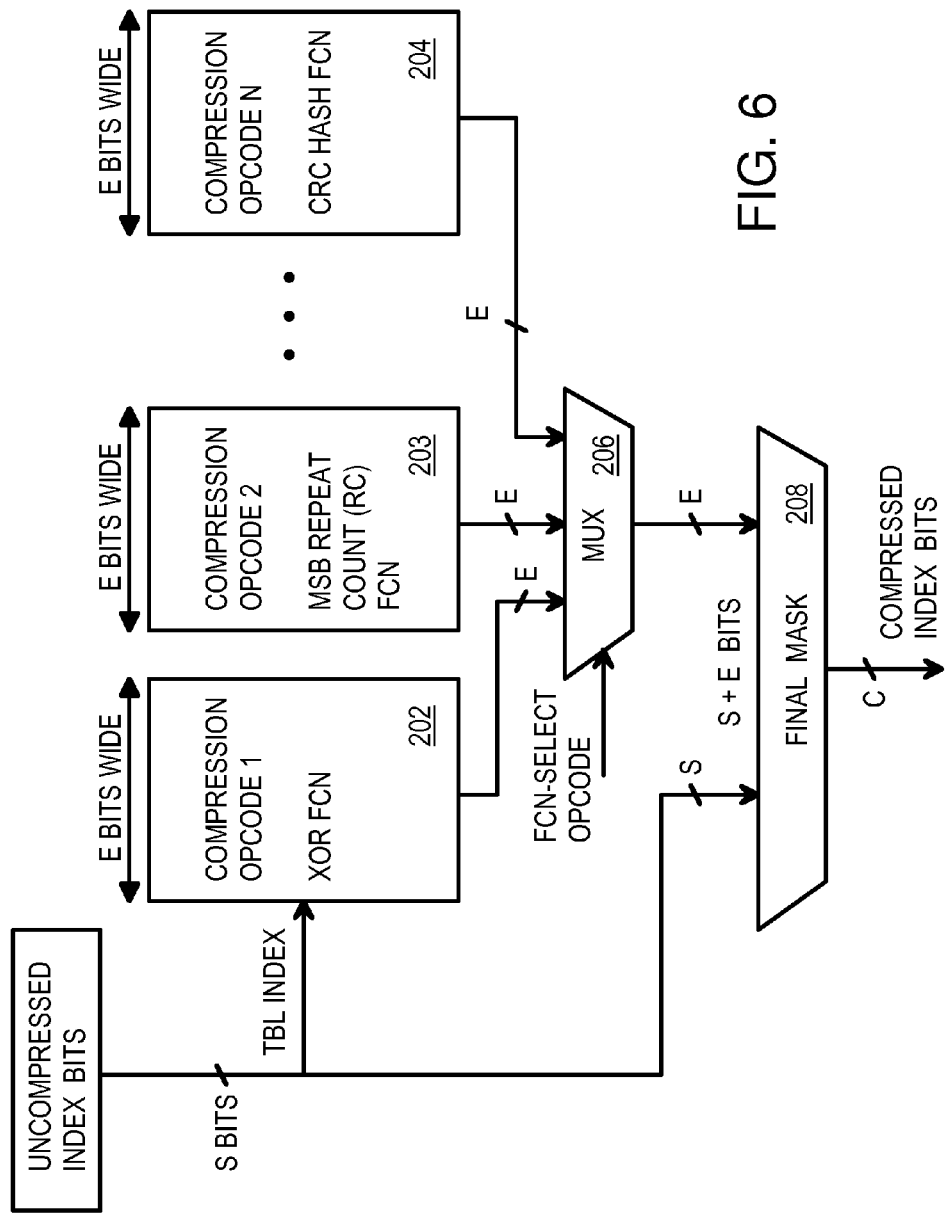
FIG. 6 shows compression-function tables in more detail.

FIG. 6 shows compression-function tables in more detail. In this embodiment, all bits of the uncompressed index are input as the address or index to function tables 202, 203, 204. For example, the stride may have 8 stride bits (S=8), which allows addressing 256 entries in the function table. The width of the final mask could be reduced by reducing the number of S bits.

Rather than have a single table that implements a single compression function, multiple tables may be available. Each table can be populated with results of a different function. For example, first function table 202 can implement an XOR function, where each of the 256 entries in table 202 is E bits wide. Each pair of input bits could be XOR'ed together to generate 4 of the E bits, while groups of 3 adjacent input index bits could be XOR'ed together to generate another 3 of the E bits.

Second function table 203 could be pre-loaded with 256 results from a repeat-count function that indicate a number of times that the MSB of the input index bits are repeated. Nth function table 204 could implement a complex CRC hash function, with each of the 256 E-bit-wide entries in table 204 being the result of a CRC on the S input index bits. Other tables 3, 4, . . . N−1 (not shown) could be pre-loaded with other function results and be used in a similar manner.

When the function produces a result that is less than the full E bits, preset data could be output for the remaining bits of the E bits, or another function could be used to generate the remaining bits.

Multiplexer or mux 206 selects one of the E-bit outputs from one of function tables 202, 203, 204. A compression-function (CF) opcode that is read from the entry read out of the prior-level stride table (or a few bits from the opcode or from an operand) is used as the select input to mux 206. When the stride entry has an opcode for an XOR function, first function table 202 is selected by mux 206, and its E bits are applied to final masker 208. When the stride entry has an opcode for a repeat-count function, second function table 203 is selected by mux 206, and its E bits are applied to final masker 208. When the stride entry has an opcode for a CRC hash function, Nth function table 204 is selected by mux 206, and its E bits are applied to final masker 208. Final masker 208 receives final mask bits from the prior-level stride table entry and selects from among the E bits from function tables 202-204 and the S uncompressed index bits to form the C compressed index bits. In an alternate embodiment, final masker 208 could receive just the E bits from the function table, not the S uncompressed index bits.

FIG. 7 highlights a repeat-count compression function. The repeat count function can be implemented in hardware logic gates, or can be pre-loaded into one of the tables of function table 200 (FIG. 5). Stride bits frequently have values with the leading most-significant-bit (MSB) is repeated several times. For example:

00000001 has the leading 0 repeated 6 times
00010101 has the leading 0 repeated 2 times
11111101 has the leading 1 repeated 5 times, for a total of 6 leading 1's.

These kinds of stride values can be efficiently compressed by encoding the repeat count. The repeat count RC can be generated as the number of times the leading bit is repeated, not counting the leading bit itself. The repeat count can be expressed as a binary number. The various stride value in the left column of FIG. 7 have repeat counts shown in the middle column, which can be binary encoded as shown in the right column.

Rather than use the stride value (the uncompressed index bits alone) from the first column as candidate bits for the compressed index bits, the repeat count RC bits may also be used from the third column. The stride bits would require four bit-positions 7, 5, 2, 1 to distinguish the 6 entries, for a table size of 16. However, the three repeat count bits of the third column can distinguish all 6 entries, for a table size of 8. Thus using repeat count in this example has reduced the compressed table size by half.

FIGS. 8A-B show an OR compression function. Another useful compression function is a logical-OR of the upper bit positions of the stride bits. In FIG. 8A, the OR count is 4, meaning that the 4 MSB's are OR'ed together. The top two rows in FIG. 8A, with stride bits of 00001101 and 00000001 have only 0's in the top 4 MSB bit-positions, and thus have an OR function result of 0 as shown in the middle column. The lower rows in FIG. 8A show stride values that have one or more 1's in the upper 4 MSB positions, and this have an OR result of 1.

The OR result shown in the middle column can be used as one of the compressed index bits, along with some of the uncompressed index bits from the first column. The OR count, which is the number of leading bit-positions to OR together, can be changed for different sets of stride bits. Alternately, one of the tables in function table 200 could be pre-loaded with different OR counts for each bit in the result, and the final mask can select the best OR counts to use.

Sometimes several stride values produce the same result. For example, In FIG. 8A, the upper two rows both produce the same result R0, while the bottom four rows have stride values that produce result R1. Since there are only two results R0, R1, the OR result in the middle column can be used to select the correct result, R0 or R1. There is no single uncompressed index bit position in the first column that can distinguish between R0 and R1. Thus the OR function is more effective than the original stride index bits at compression for this example.

When a regional entry has all 0's or all 1's, repeat-count-encoding aliasing might occur. For example, an entry of 1111XXXX has a repeat count of 3. When this entry is stored in a table, it should match many incoming stride values such as 11111XXX (RC=4), 111111XX (RC=5), 1111111X (RC=6), and 11111111 (RC=7). However, when the incoming stride values are compressed using repeat count, their repeat count values of RC=4, 5, 6, or 7 would not match the stored entry, which has a repeat count of 3 (RC=3).

To solve this problem, when repeat count encoding is used, the incoming stride values have their repeat counts forced to match the stored repeat count. When the incoming entry has all 1's followed by X's, that incoming entry's repeat count is reduced to match the stored repeat count, so that the stored entry is found. For the example above, the repeat counts of RC=4, 5, 6, 7 are reduced to RC=3 so that the stored entry with RC=3 is matched.

An additional 3-bit field may be stored in the prior stride table's entry to force the repeat count to the correct value when the all 1's situation is detected. Another 3-bit value may be used to force the repeat count to the correct value when the all 0's situation occurs. These 3-bit encodings are normally a default value such as 0, but when non-default they over-ride the normal repeat-count encoding, reducing and forcing the repeat count to the specified value. Strides larger than 8 bits require more than 3 bits for these fields. If there is not enough space to store 3 bits for these fields, fewer bits may be stored, such as only 2 bits. In this case, when an all 1's or all 0's value with more than a repeat count of 2 (more than 3 consecutive 1s or 0s) is present, the repeat count may simply not be used for encoding these values since there are insufficient bits to indicate a forced repeat-count value for the cases when there are values with 1s repeated by 3 or more or 0's repeated by 3 or more.

Regional Entries for Longest-Prefix Matching—FIG. 8B

Some entries may be expressed using a don't care (X) symbol rather than a 0 or 1. For example, in FIG. 8B, the first entry 0000XXXX matches both of the first two entries 00001101 and 00000001 in FIG. 8A. The range value 0000XXXX represents any binary value less than 16. The last four entries in FIG. 8B together represent any 8-bit binary value that is greater than or equal to 16.

Results for entries in the final (leaf) level of the stride tables represent one value of the input key. However, when many leaf entries have the same result, they can be combined and stored at an intermediate level of the stride tables. A range value can represent all input values for the leaf entries. When the range value is stored in the stride tables, it is known as a regional entry since it covers a region rather than a single exact-match entry.

The regional entries may be stored at intermediate levels of the stride tables rather than at the final (leaf) level. Representing regional entries is useful because a regional entry represents match results for many values of the input key. The number of entries in the stride tables can be reduced, since one regional entry can represent many final entries.

In FIG. 8B, a regional entry with a range value of 0000XXXX can match the top two entries of FIG. 8A. While a single range value cannot cover all four lower entries of FIG. 8A, the OR result shown in the middle column can be used. When OR is 1, result R1 is output. When OR is 0, result R0 is output. Thus the OR compression function can be especially useful for compressing range values.

FIGS. 9A-C show a regional entry that covers a range of input key values as disclosed in the parent application. In FIG. 9A, regional entry 50' is stored at an intermediate level of the stride tables. Tag field 52 contains a tag that the stride bits for this level must match. MSB-unmasked field 54 indicates a mask that can be applied to the tag value from tag field 52 when matching the stride bits from the input key.

For example, MSB-unmasked field 54 may have a value of 4 that indicates that only the 4 MSB bits are unmasked and thus matched; the remaining LSB's are not matched or don't cares (X's). When the stride size is 7 bits, and the most-significant-bits-unmasked (MSBU) is 4, the 4 upper bits of the tag are matched while the lower 3 bits are not matched. The input key is compared to the masked tag. When the tag value in tag field 52 is 1010000, the masked tag is 1010XXX. The stride bits from the input key only have to match 1010XXX rather than the full 7 bit tag of 1010000. Thus key values such as 1010111 or 1010011 create a match.

When a match occurs, even when the match is a masked match, the current result is obtained and the lookup ends without traversing the remaining levels of the stride tables. Field 58 is read for the current result, or a pointer to the current result for the lookup. When the stride bits from the input key match the masked entry, the current result R1 is returned which the most specific region match for a given input key.

FIG. 9B shows that a range or region of input-key values can match the regional entry of FIG. 9A. The masked tag value for the entry is 1010XXX, which matches stride bits from key values for the current level with values of 1010000, 1010001, 1010010, . . . 1010101, 1010110, 1010111. There are 8 values of the stride bits that can match the regional entry.

Since each stride value can point to whole tables at lower levels, each stride value can cover a wide region of entries in the final level of the stride tables. Thus the 8 values matched at the current level of the table can cover many thousands or millions of entries in the final level of the stride tables.

Figure 12:
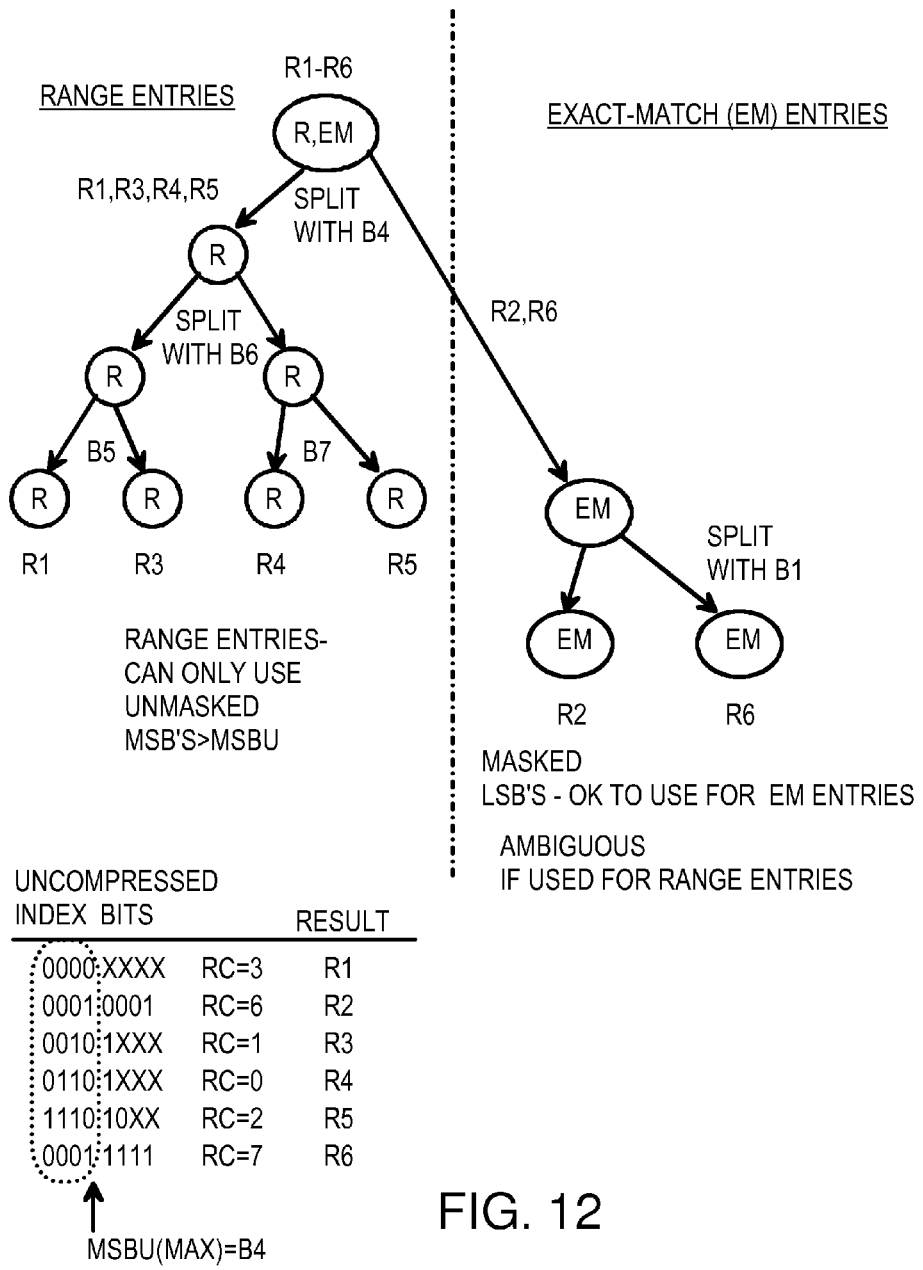
FIG. 12 shows splitting a group of entries and selecting index bits.

When finding the discriminate bits, such as using routine 100 of FIGS. 12-13 of the parent application, some adjustments should be made for regional entries. In FIG. 9C, when a stride table has a regional entry, only the MSB bits indicated by MSB-unmasked field 54 are placed in the set of candidate bit-positions. The masked LSB bits are removed from the set of candidate bits. The candidate bits are only the MSBs that are valid for all of the entries in the set of groups with more than one entry. Thus there are only unmasked bits used for creating index vector.

When merged bits are created from the uncompressed index bits, merged bits that are created from masked bits should not be used. Only merged bits that are created from unmasked bits should be placed in the set of candidate bits.

Figures 10A, 10B, 10C:
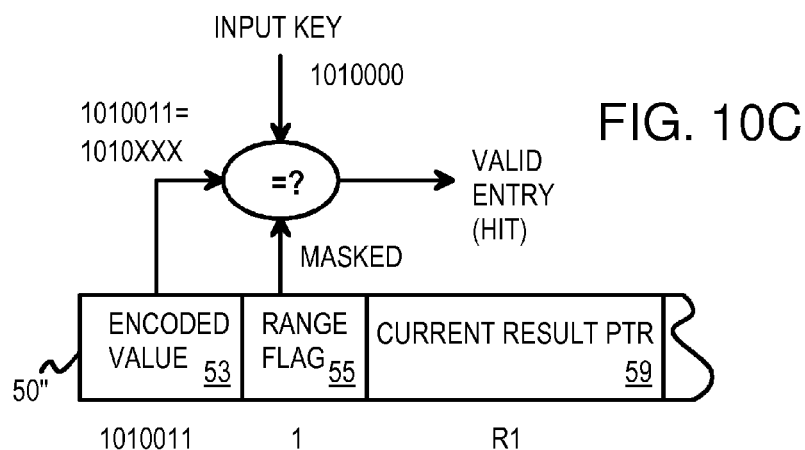
FIGS. 10A-C show range encoding for regional entries.

FIGS. 10A-C show range encoding for regional entries. Since X is not a binary digit, X cannot be directly stored. Instead, MSB-unmasked field 54 indicated the number of MSB bits that should be unmasked in FIGS. 9A-C. However, rather than having an additional field 54 for indicating a range value, the range value can be encoded into the stride value, along with a range flag bit that indicates when the range encoding is used.

In FIG. 10A, a series of 4 X's are encoded as 0111. XX is encoded as 01, and XXXXXX is encoded as 011111. In general, a series of X's is encoded with the same number of bits as X's, with the first bit being a 0 and all remaining bits being 1's.

Since the range always has an X in the LSB, a range-encoded value ends in a series of 1's that is preceded by a 0. The 01111 ending sequence can be replaced with a sequence of X's to generate the unencoded range value.

FIG. 10B shows range-encoded values with a range flag. Some values of the uncompressed index bits in the first column are exact-match (EM) values, having no X's. The second and last values in FIG. 10B are exact values, and have their range flag cleared to 0 as shown in the fourth column. The other values are range values, having one or more X's, and have their range flags set to 1.

To generate the range-encoded values in the last column, the final sequence of X's in the unencoded, uncompressed index bits are replaced with a string of 1's with a leading 0. Exact-match values are not encoded since they have no X's, and are merely copied over without change. However, the flag bit is attached to the encoded values, as shown in the last column.

The range-encoded values of the last column can be stored in stride tables as the stored stride value to match, such as the tag value in tag field 52 of FIG. 9A. In FIG. 10C, a regional entry stores a stride value as a range-encoded value, along with the range flag.

Regional entry 50″ is stored at an intermediate level of the stride tables. Encoded tag field 53 contains an encoded tag that the stride bits for this level must match. Range-flag field 55 contains the range flag. When range-flag field 55 contains a 1, encoded tag field 53 contains a range-encoded value for a regional entry. When range-flag field 55 contains a 0, encoded tag field 53 contains a normal, non-encoded value for an exact match.

The input key is compared to the decoded tag read from encoded tag field 53. When the tag value in tag field 53 is 1010011, and the range flag in field 55 is set, the tag is decoded to 1010XXX, since the last three bits 011 are encoded to represent XXX. The stride bits from the input key only have to match 1010XXX rather than the full 7 bit tag of 1010011. Thus key values such as 1010000 or 1010111 or 1010011 create a match.

An encoded tag field value with the range flag set can be decoded by searching from the LSB for the least-significant bit-position containing a 0. All of these LSB bit positions up to and including the LSB 0 are replaced with X's. The trailing 0111 string is thus replaced by X's.

Other kinds of range encoding could be used. For example, a 1 followed by 0's could be used. When an encoded value is all 1's or all 0's, another flag bit could be used to flag the special case that could otherwise be aliased. Rather than using multiple bits to encode MSB-unmasked field 54 (FIG. 9A), a single range-flag bit can be added to the range encoded value.

FIGS. 11A-B shows using unmasked bit positions of range-encoded index bits for compression. In FIG. 11A, range and exact-match values in the first column are range-encoded by the encoded index bits of the last column, along with the range flag. The leading repeat count is shown in the second column and encoded as a binary number in the third column.

The encoded index bits could be sent to the final masker as the candidate bits. Bit positions 6, 5, 4, 2 distinguish these entries and could be used as the compressed index. The three repeat count bits could also be used for better compression in this example.

Examining the uncompressed index bits for all the entries in the first column, most bit positions have at least one X. For example, bit positions 3, 2, 1, 0 have an X for the 1st, 3rd, 4th, and 5th entries. The MSB-unmasked (MSBU) for these entries is B4. Bit position 6 has an X for the 4th entry, so MSBU for the fourth entry is B7, the first bit-position that does not have an X, and is unmasked.

The most-significant-bits-unmasked (MSBU) is the count of unmasked bits which do not have an X. It is the least-significant of the unmasked bits, the least-significant unmasked bit position.

For a group of entries, some entries may have different numbers of X's and thus different MSBU's. The maximum MSBU for a group of entries is the maximum of the MSBU's for those entries, which corresponds to the entry in that group with the largest range. The minimum MSBU is the minimum of the MSBU's for that group of entries, which is the entry in that group with the smallest range.

For the example shown in FIG. 11A, the first entry has an MSBU of B5, the second and sixth entries each have an MSBU of null (there are no X's in the second entry), the third and fifth entries each have an MSBU of B5, and the fourth entry has an MSBU of B7. The MSBU's are B5, null, B5, B7, B5, null, respectively. The MSBU(max) over this group is B7, and the MSBU(min) is null.

When MSBU(max) is close to the MSB, functions such as repeat count often produce the best compression. When MSBU(max) is smaller than the MSB, complex functions such as hash functions often produce better compression than repeat count.

FIG. 11B shows another group of entries that are split by MSBU(max) into unmasked and masked bit positions. For the group of entries in the left column of FIG. 11B, there are no X's in the upper 4 bit positions. MSBU(max) is bit 4 (B4), the right-most bit-position that is unmasked across all entries in this group of entries. Bit positions B3, B2, B1, B0 all have at least one entry with an X in that bit position.

Bit-positions below MSBU(max) may have a masked bit (X) for some entries. If these masked bits are selected for the compressed index, ambiguous results may occur. Thus the lower unmasked bits are somewhat undesirable.

Bit positions above and including MSBU(max) have only unmasked bits. These upper unmasked bits are useful and non-ambiguous. The upper unmasked bits can safely be used for the compressed index bits.

Sometimes there are not enough upper unmasked bits, such as when MSBU(max) is large, or the number of entries in the group is large. Then some of the lower masked bits must be used. The upper unmasked bits can be used first, then the lower masked bits can be used as secondary bits to split apart sub-groups of exact-match entries that have only exact entries. The secondary bits could also be used for sub-groups that have lower MSBU(max) values within that sub-group, where these secondary bits are above that sub-group's lower MSBU(max).

FIG. 12 shows splitting a group of entries and selecting index bits. The group of 6 entries is shown in the table at the bottom of FIG. 12, and includes 2 exact match values and four range values with MSBU(max) at bit position B4. The six entries produce result values R1 to R6.

Ideally, just the four bit positions above MSBU(max) are used as the compressed index bits. However, entries 2 and 6 cannot be distinguished using the upper 4 bits, since they have the same upper 4 bits and differ only in the lower bits that are below MSBU(max).

In the chart at the top of FIG. 12, the top group contains all 6 entries R1 to R6 in the bottom table. Both range (R) and exact match (EM) entries are in this group. Bit B4 is chosen as the first distinguishing bit. Since B4 is equal to or above MSBU(max), it is safe to use with range entries (R). Bit B4 is 1 for entries 2, 6, and 0 for entries 1, 3, 4, 5. Thus two sub-groups are formed, one with range entries R1, R3, R4, R5, and the other with exact-match entries R2, R6.

The left sub-group of range entries R1, R3, R4, R5 can be split using bit B6. The left sub-group has range entries R1, R3, while the right sub-group has range entries R4, R5. The left sub-group can be split into individual entries R1, R3 using bit B5, while the right sub-group can be split into individual entries R4, R5 using bit B7.

Since all of bits B4, B6, B5, B7 are at or above MSBU (max) of B4, these bits are safe to use to distinguish the range entries.

The exact-match sub-group of entries R2, R5 can be split using bit B1 into the separate entries R2 and R5. However, B1 is less than MSBU(max) and could not be used with range entries. However, since neither of R2 or R5 is a range entry, it is safe to use B1<MSBU(max) for splitting this sub-group. B1 could not be used to split a sub-group with range entries. The sub-group of R1, R5 have a MSBU(max) of null, since no bits are masked in these 2 entries.

Figure 13A:
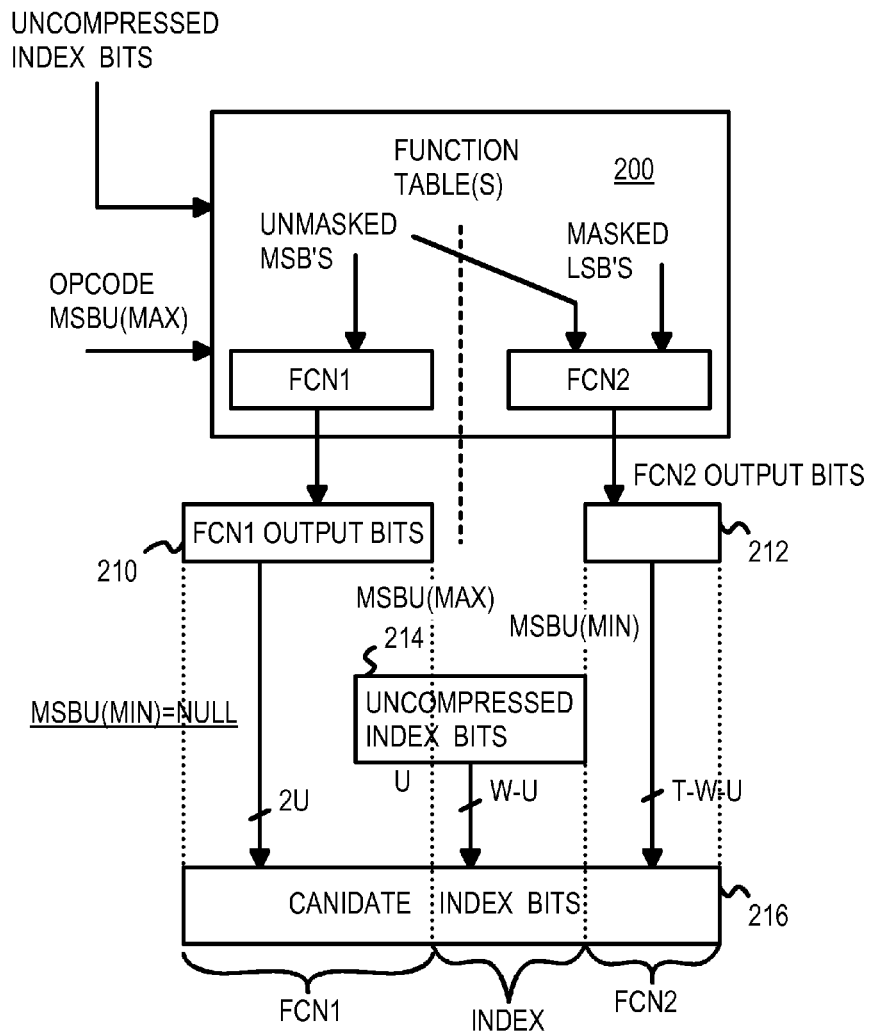

FIGS. 13A-D diagram upper unmasked and lower masked bits generated by a function table and incorporated into candidate index bits. In FIG. 13A, uncompressed index bits from a stride are applied as the address inputs to function table 200. A compression-function opcode read from the last stride's entry selects from among several tables, each storing results for a different function or sets of functions.

For example, the upper bits output by function table 200 may be results for a first function FCN1, while the lower bits output at the same time by function table 200 are for a second function FCN2. The division between FCN1 upper function bits 210 and FCN2 lower function bits 212 can be MSBU (max), the least-significant unmasked bit across all combinations of uncompressed index bits applied to function table 200.

For an 8-bit index, when MSBU(max) is less than or equal to B5, there are at least 3 MSB's that are unmasked. Having three unmasked upper bits is often sufficient to be useful for separating entries. The upper function FCN1 can be a complex hash function that generates FCN1 upper function bits 210. The lower function FCN2 can also be a complex hash function or can be some other function that generates FCN2 lower function bits 212.

Candidate index bits 216 are the bits available that the final mask selects the compressed index bits from. The upper bits in candidate index bits 216 are taken from FCN1 upper function bits 210. The lowest bits in candidate index bits 216 are taken from FCN2 lower function bits 212. Intermediate bits in candidate index bits 216 are taken from uncompressed index bits 214, the input stride bits.

Bits above MSBU(max) in uncompressed index bits 214 are from FCN1 upper function bits 210, while bits below MSBU(min) in uncompressed index bits 214 are taken from FCN2 lower function bits 212.

Thus when MSBU(max) is B5 or less, and there are sufficient unmasked upper bits, a hash function can be used, and candidate index bits 216 taken from all three sources.

In FIG. 13A, MSBU(min) is null, and MSBU(max) is U, which is B5 or less. There are T candidate index bits 216, and there are W uncompressed index bits 214. There are 2U FCN1 upper function bits 210. The upper U bits in uncompressed index bits 214 are replaced by 2U FCN1 upper function bits 210. W-U bits are taken from uncompressed index bits 214, with the remaining T-W-U bits supplied from FCN21 lower function bits 212.

Figure 13B:
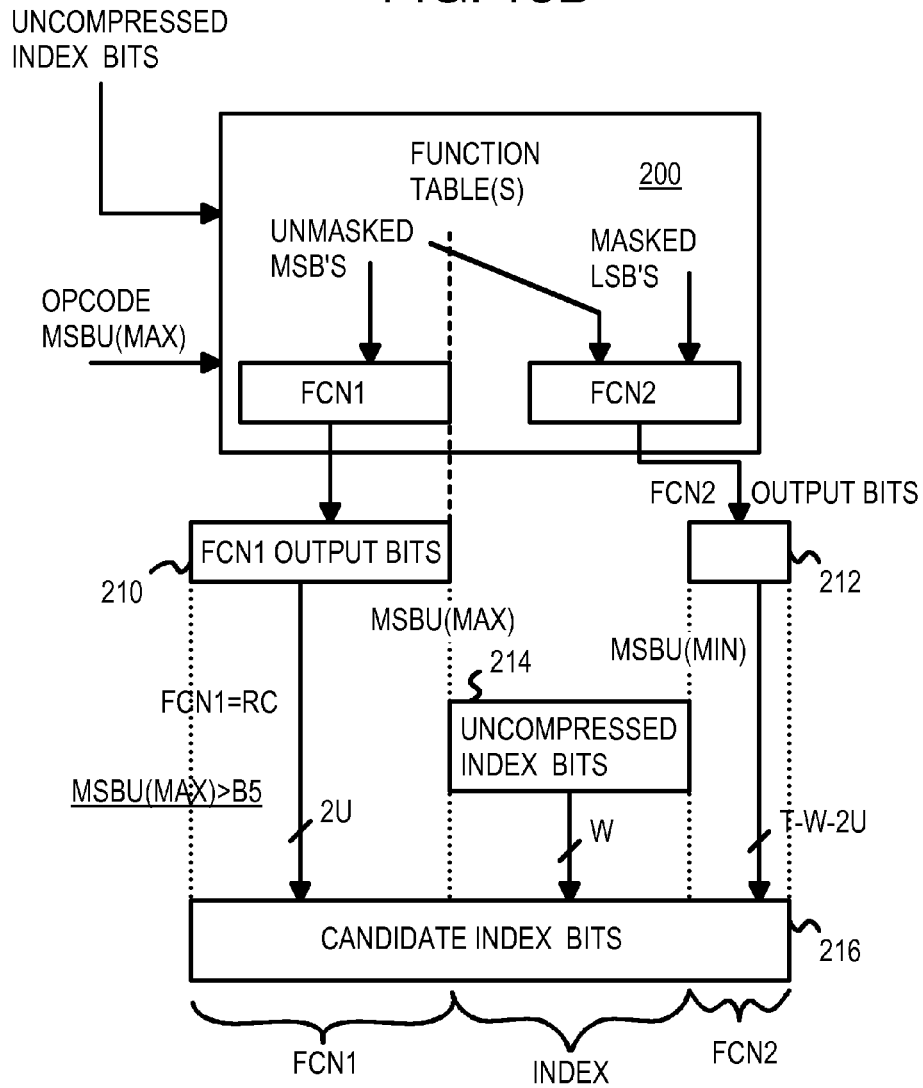

In FIG. 13B, MSBU(max) is greater than B5. There are less than 2 unmasked upper bits, which is insufficient for complex hash functions. Instead, function table 200 implements a repeat count function as FCN1 to generate FCN1 upper function bits 210. These 2U repeat count bits are copied to candidate index bits 216. All of the W uncompressed index bits 214 are also included in T candidate index bits 216. MSBU(max) is the largest bit in uncompressed index bits 214 while MSBU (min) is the lowest bit in uncompressed index bits 214.

FCN2 lower function bits 212 can be generated by function table 200 using any function. Lower bits in FCN2 lower function bits 212 below MSBU(min) are copied to candidate index bits 216. Repeat count is especially useful when there are few unmasked upper bits. Having too few bits is problematic since there may be insufficient bits to provide any effective compression.

In FIG. 13C, MSBU(min) is null. There are some exact match entries. All T−W−U+V bits of FCN2 lower function bits 212 are copied to candidate index bits 216. The V bits below MSBU(min) in uncompressed index bits 214 are replaced by FCN2 lower function bits 212, and the U bits above MSBU(max) in uncompressed index bits 214 are replaced by U bits from FCN1 upper function bits 210.

In FIG. 13D, FCN2 lower function bits 212 are not included in candidate index bits 216. Instead, the 2U FCN1 upper function bits 210 and W uncompressed index bits 214 are combined to form candidate index bits 216. This configuration is useful when there are no masked bits. MSBU(min) and MSBU(max) are both null.

Alternate Embodiments

Several other embodiments are contemplated by the inventor. For example, while simple examples have been shown to facilitate understanding, more complex situations can be handled by processors and other electronic equipment in more practical uses. Compression, masking, function tables, and other functions may be implemented as hardware gates, programmable logic, or other hardware, firmware, software, or various combinations thereof. A function table could be implemented as a SRAM, DRAM, ROM, EEPROM, flash memory, programmable logic, or other kind of technology and may be part of a later memory or array, and be integrated with other functional blocks.

In FIG. 6, some of the S uncompressed index bits could be included in the function-select opcode, or as an operand of that opcode. Then some of the S bits are used to select one of tables 202, 203, 204. The S uncompressed input bits do not have to be applied to final mask 208, or could be applied at another level of muxing (not shown), such as between mux 206 and final mask 208. The advantage of this alternate embodiment is that the width of the final mask may be reduced from S+E bits to E bits. A narrower final mask may require fewer bits to store in the stride tables, thus reducing storage requirements.

Function table 200 may implement several functions per table, rather than just a single function per table. Some indexes in the table may implement one function while other indexes output results from a different function. Each output could be a mix of several functions, such as one function for high output bits and another function for low output bits. For example, in FIG. 6, table 203 could implement a repeat count for some indexes, but an OR function for other indexes within the same table 203. The lower bits output from table 203 could be the results of XOR functions, while the upper bits are the results or the repeat count or OR functions. Many other combinations of functions are possible using tables, allowing for great design and compression flexibility.

The initial mask is optional and may be used with some embodiments and not with other embodiments. Some levels of stride tables may use the initial mask while other levels do not use the initial mask. Some stride-table entries may have extra bytes that allow for longer masks while other entries may have short formats with few or no bytes available for masking. Formats may vary for different stride levels and embodiments.

A wide variety of other compression functions may be supported. For example, the number of leading 1's or 0's may be counted and compressed. Complex logical gates may be substituted, or multiple levels of logical gates, or gates with wider inputs or multiple outputs. Inversions could be added. Some operations may be conditional, such as a conditional rotate or conditional shift. Compression functions that are priority encoders or leading-one or leading-zero encoders and compressors may be supported. Encryption or signature algorithms may be supported. Designers may devise complex compression functions that are particularly useful for compressing certain kinds of stride tables. Encryption algorithms could be used as compression functions. A subset of the possible compression functions may be supported, such as only XOR functions while AND and OR functions are not supported. These functions could be implemented as data stored in function tables, or as hardware logic, or programmably such as with updatable software or firmware.

Stride tables with only one valid entry may be compressed using an identity function as the compression function. All values of stride bits then point to the only entry for that table. When a table has only two valid entries, a single bit may be generated to distinguish between the two entries.

The compressed stride table can be a perfect hash table wherein there are no collisions between valid entries. The tag field may not be required in all embodiments. When the stride table is fully compressed, it can be a minimal perfect hash table. A minimal, fully-compressed table has a size that is the nearest power of two that is equal to or greater than the number of valid entries in the table. Collisions could be allowed in the compressed index in some embodiments. A bucket containing two or more entries could be allowed when collisions occur.

Not all fields need to be present in each entry. For example, when the stride size is fixed in the table design, the stride size field is not needed. Some levels of the stride tables could use fixed, predetermined strides, and prior-level entries pointing to these tables do not need the stride size field, while other levels have a variable stride size and their prior-level entries have the stride size field. Result pointers are only needed for final-level entries or when an intermediate or current result is present. The final level tables might not need pointers to next-level tables when there is no next level to point to.

Other fields could be added to various entries, such as memory or table management fields. Fields could be formatted in a variety of ways and encodings, and may be combined or split. Regional entries could be supported in other ways such as pointers to additional tables or entries. Various formats and physical embodiments to the stride tables are possible. Other modifications to the basic multi-bit Trie structure and lookup key formats are possible.

Some table structures or levels within a table structure may not implement all compression functions, but only support a subset of the functions. For example, supporting XOR alone may be sufficient, without supporting AND and OR compression functions. Merged bits could be generated for each of the supported functions, including some of the more complex functions such as shifts, and used to select from among the merged bits that were generated using the various compression functions to find the best set of determinant bits. All possible compression functions could be tested during initialization to find the optimal functions to use. More complex or simplified routines may be substituted. The routine to find determinant bits could iterate over several levels at a time rather than over one level, or an exhaustive search over all possible combinations of bits may be performed and evaluated to find deterministic bits.

Values can be inverted, offset, combined with other values, and manipulated in many ways using known mathematical properties. For example, rather than finding the maximum delta, the delta could be inverted to a negative number and then the smallest (most negative) delta could be chosen as the "maximum" delta. An inversion could be added to an XOR to generate an exclusive-NOR (XNOR), but this is simply a derivative of an XOR and within a family of XOR functions. Other logic tricks and manipulations are contemplated and considered to be within the scope of the claims.

Multiplexer 206 could be a hardware multiplexer, a multiplexed bus, a wired-OR function, or enabling and disabling of inputs to a common bus, and does not have to be built from 2:1 or discrete multiplexers.

In yet another variation, three levels of masking are used. The compressor creates initial compressed index bits, and then using compressed bits, creates a new index bit set having only new candidate bits selected with the mask applied over only new candidate bits. In this alternative, a final selection is made between the Index bits selected from the input bits only, or index bits selected from the new candidate bits created from the original selected index bits from input bits only.

The initial mask may have different uses in different embodiments. The initial mask may indicate which index bits are selected and applied as inputs to the merge or compression logic. For example, some of the S uncompressed index bits may bypass initial masker 24 and be directly applied to final masker 30. Initial masker 24 may only select bits to apply to logical merger 28. The initial mask may indicate which initial index bits are selected to be part of the compressed index bits.

The final compressed index bits could be selected from only initial index bits, or selected only from final masked bits. This can optimize the number of mask bits needed. For example, if both the initial mask and the final mask required S mask bits, having both masks would occupy 2S bits. If only S mask bits were used, a single select bit could indicate when the mask bits are for the initial mask, and when the mask bits are for the final mask. Then only S+1 bits would be needed. Other variations are possible.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. A lookup structure comprising:
a plurality of stride tables that form a multi-bit Trie structure for performing lookups, wherein the stride tables are arranged into a plurality of levels;
a lookup input for receiving an input lookup key dividable into a plurality of strides, wherein the plurality of strides correspond to the plurality of levels, wherein at least two of the strides have multiple bits each, wherein a stride is for locating an entry in a stride table at a level in the plurality of levels;
a compressed stride table in the plurality of stride tables at an intermediate level in the plurality of levels, wherein the compressed stride table is pointed to by a table pointer in a prior-level selected entry in a prior stride table at a prior level in the plurality of levels, the prior-level selected entry being selected by a prior stride;
a plurality of valid entries in the compressed stride table, wherein a selected valid entry in the compressed stride table is selected with compressed index bits, the compressed index bits being fewer bits than a current stride in the plurality of stride, the current stride for the compressed stride table;
an index compressor, receiving current stride bits from the lookup input for the current stride of the input lookup key, the index compressor generating the compressed index bits; and
pointer fields stored in the plurality of valid entries, the pointer fields containing pointers to stride tables in a next level in the plurality of levels or pointers to lookup results;
wherein the lookup structure is embodied on a non-transitory computer-readable storage medium;
wherein the index compressor comprises a function table and a final masker;
wherein the function table comprises a plurality of addressable entries each storing a function-result value, wherein the current stride bits form an address into the function table to select a selected entry with an output function-result value, wherein the output function-result value is a table-defined function of the current stride bits;
wherein the final masker comprises a selector for selecting a subset of bits in the output function-result value selected by the function table to generate the compressed index bits;
wherein the selector selects the subset of bits in response to a final mask value stored in the plurality of valid entries in the compressed stride table,
whereby the function table implements the table-defined function of the index compressor;
wherein a compressed stride table has $2^D$ entries locatable by D compressed stride bits that are compressed from S stride bits from the input lookup key;
whereby function tables store function results for different table-defined functions and whereby $2^S-2^D$ entries have been removed to form the compressed stride table,
whereby stride bits are compressed by table-defined functions before locating entries in compressed stride tables.

2. The lookup structure of claim 1 further comprising:
a compression opcode field stored in the prior-level selected entry, the compression opcode field specifying the table-defined function;
whereby table-defined functions for compression are specified by compression opcode fields stored in the prior-level selected entry.

3. The lookup structure of claim 2 wherein the function table further comprises:
a plurality of result tables, each result table containing function-result values for a different table-defined function, each result table having a plurality of addressable entries selectable by the current stride bits;

a multiplexer, coupled to outputs from the plurality of result tables, and responsive to the compression opcode field, for selecting one of the function-result values output by a selected result table in the plurality of tables, wherein the compression opcode field selects the selected result table having a selected table-defined function indicated by the compression opcode field, whereby multiple table-defined functions are stored in multiple result tables in the function table.

4. The lookup structure of claim 2 wherein the table-defined function for is a hash function.

5. The lookup structure of claim 2 wherein the table-defined function is a cyclical-redundancy-check (CRC), a MD5 hash, or a DES encryption.

6. The lookup structure of claim 2 wherein the table-defined function is a leading-repeat count function that indicates a repeat count of a leading bit in the current stride bits.

7. The lookup structure of claim 1 wherein the function-result values contain a first subset of bit-positions and a second subset of bit-positions;
wherein the function-result values contain results of a first function in the first subset of bit-positions;
wherein the function-result values contain results of a second function in the second subset of bit-positions.

8. The lookup structure of claim 7 wherein the first function is a function of upper unmasked bits in the current stride bits;
wherein the second function is a function of upper unmasked bits and of lower masked bits in the current stride bits;
wherein the upper unmasked bits are for upper bit-positions in the current stride having no masked bits for entries in the compressed stride table;
wherein the lower masked bits are for lower bit-positions in the current stride having a masked bit for at least one regional entry in the compressed stride table;
wherein the regional entry matches at least two values of the current stride bits due to the masked bit matching both a 1 and a 0, whereby upper unmasked bits participate in the first function and lower masked bits do not participate in the first function.

9. The lookup structure of claim 8 further comprising:
a least-significant unmasked bit position in the current stride bits;
wherein the upper unmasked bits are for bit positions of equal or greater significance than the least-significant unmasked bit position;
wherein the lower masked bits are for bit positions of lesser significance than the least-significant unmasked bit position, whereby the least-significant unmasked bit position separates the upper unmasked bits from the lower masked bits.

10. The lookup structure of claim 9 further comprising:
a lower subset of entries in the compressed stride table, wherein entries in the lower subset are distinguishable from each other using the second function generated from the lower masked bits,
wherein the lower masked bits distinguish entries in the lower subset;
wherein the index compressor outputs a third subset of the current stride bits, together with the function-result values containing results of the first function in the first subset of bit-positions, and the function-result values containing results of the second function in the second subset of bit-positions;
wherein the third subset of the current stride bits are for middle bit-positions between the first subset of bit-positions and the second sub-set of bit-positions.

11. The lookup structure of claim 10 wherein the lower subset contains exact-match entries having no masked bits;
wherein regional entries that are not in the lower subset contain masked bits;
wherein the second function distinguishes the exact-match entries in the lower subset having no masked bits.

12. The lookup structure of claim 9 wherein the first function is a leading-repeat count function that indicates a repeat count of a leading bit in the current stride bits when the least-significant unmasked bit position is within two bit-positions of a most-significant-bit (MSB) position.

13. The lookup structure of claim 9 further comprising:
a regional entry in the compressed stride table, the regional entry containing a series of masked bits that are encoded as a series of binary bits;
wherein the series of binary bits comprises a first binary bit of a first polarity followed by a plurality of binary bits all having a second polarity that is opposite to the first polarity;
wherein the regional entry matches at least two values of the current stride bits due to each masked bit in the series of masked bits matching both a 1 and a 0, whereby masked bits are encoded as binary bits for regional entries.

14. The lookup structure of claim 9 wherein the current stride bits from the lookup input for the current stride of the input lookup key are completely replaced by the compressed index bits from the index compressor,
wherein the compressed index bits contain only bits from the index compressor.

15. The lookup structure of claim 9 wherein the first function is a hash function, an encryption function, or a cyclical-redundancy-check (CRC) function when the least-significant unmasked bit position is at least two bit-positions less significant than a most-significant-bit (MSB) position.

16. A table lookup method comprising:
receiving an input lookup key and dividing the input lookup key into a plurality of strides of stride bits, including a first stride, and a second stride;
using the first stride to locate a first entry in a first-level stride table;
locating a second-level stride table in a plurality of second-level stride tables using a table pointer in the first entry;
applying the stride bits in the second stride as an address into a function table to select a first selected entry in the function table, and reading a first function result from the first selected entry;
generating compressed second stride bits from the first function result read from the function table;
using the compressed second stride bits to locate a second entry in the second-level stride table;
continuing for any other strides in the input lookup key until a final entry in a final-level stride table is located;
returning a lookup result stored in or pointed to by the final entry in the final-level stride table;
wherein the second-level stride table is a compressed stride table that has been compressed to remove invalid and empty entries, wherein a compressed stride table has $2^D$ entries locatable by D compressed stride bits that are compressed from S stride bits from the input lookup key;
reading a first function selector from the first entry;
using the first function selector to select a first selected function table in a plurality of function tables, wherein each function table in the plurality of functions tables store function results for different table-defined functions;

wherein the first function result is read from the first selected function table in the plurality of function tables addressed by the stride bits in the second stride;

reading a second function selector from the second entry; and using the second function selector to select a second selected function table in the plurality of function tables;

wherein the second function result is read from the second selected function table in the plurality of function tables addressed by the stride bits in the second stride;

reading a final mask from the first entry;

using the final mask to select a subset of bits in the first function result or in the second function result to generate compressed stride bits, whereby function tables store function results for different table-defined functions and whereby $2^S-2^D$ entries have been removed to form the compressed stride table whereby stride bits are compressed by table-defined functions before locating entries in compressed stride tables.

17. The table lookup method of claim 16 further comprising:

comparing a second tag value stored in the second entry with the second stride to determine when a valid match has occurred;

decoding mask-encoded bits in the second tag value to generate second masked bit-positions when a second mask flag stored in the second entry is set masking uncompressed stride bits in the second stride indicated by the second masked bit-positions when comparing the second tag when the second mask flag is set;

whereby masked comparisons allow for a partial stride match to determine when a valid mask has occurred.

18. The table lookup method of claim 17 further comprising:

when a masked comparison generates a partial stride mask in a current-level stride table at an intermediate level, the current-level stride table operates as the final-level stride table with the final entry;

returning the lookup result stored in or pointed to by the final entry in the final-level stride table, whereby intermediate levels generating partial stride matches return the lookup result before any remaining levels of stride tables are accessed.

* * * * *